INVENTORS.
ARMISTEAD WHARTON
RICHARD R. DEVER
ATTORNEY

INVENTORS.
ARMISTEAD WHARTON
RICHARD R. DEVER
BY
ATTORNEY

INVENTORS
ARMISTEAD WHARTON
RICHARD R. DEVER

INVENTORS.
ARMISTEAD WHARTON
RICHARD R. DEVER
BY
ATTORNEY

United States Patent Office 2,780,288
Patented Feb. 5, 1957

2,780,288

FEEDING, CUTTING, AND STACKING STRIP MATERIAL

Armistead Wharton and Richard R. Dever, Rochester, N. Y., assignors to General Dynamics Corporation, a corporation of Delaware Application September 1, 1955, Serial No. 532,072

15 Claims. (Cl. 164—49)

The present invention relates to material handling devices, and more particularly to a device for feeding, cutting, and stacking strip material.

Certain types of business and accounting machinery may employ electrically operated and controlled typewriters, adding machines, paper punches, or the like, for periodically recording intelligence on a strip of flexible material, such as paper. In some applications, the intelligence is assembled in a uniform and repetitive pattern and the strip is cut into uniform tickets containing the respective patterns of intelligence for successive operations of the machine. For example, it has been proposed to automatically record the pertinent information pertaining to each long distance telephone call, such as the identities of the called and calling lines, the date and time of extending the call, and the duration of the call. Such information may be assembled and recorded in a number of printed lines on a strip of paper being fed through the recording machine, and after the assemblage of the information for each call, it is desired to cut the strip thus recorded into a series of so-called toll tickets each containing the assembled and recorded information for a respective long distance call.

It is an object of the present invention to provide an improved mechanism for handling flexible strip recording material as it is discharged from a recording machine such as an electric typewriter, paper punch, or the like.

Another object of the invention is to provide an improved material handling mechanism which will receive a strip of flexible material, cut a portion or ticket from the strip, and feed the cut portion into a suitable receiver all in a simple and automatic manner under control of a single operating signal.

Yet another object of the invention is to provide an improved material handling mechanism for receiving a strip of flexible recording material from a recording machine and for cutting a portion of said strip and feeding such portion into a suitable receiver under control of a single operating signal as received from the recording machine.

Still another object of the invention is to provide an improved material handling mechanism for feeding and cutting a strip of flexible material into a plurality of ticket portions, and for feeding each portion as cut into a stacking hopper, and further having a simplified mechanism for indicating the feeding of a sufficient amount of strip material to be cut into a ticket portion as such strip material may be fed from a recording machine.

A further object of the invention is to provide material handling mechanism for feeding ticket portions as they are successively cut from a flexible strip, and for stacking such ticket portions in a suitable hopper in timed relation to the cutting of each ticket portion and in a uniform and neat manner without jamming.

Further objects and the attending advantages of the invention will be apparent with reference to the following specification and drawings in which Fig. 1 is a perspective elevation of an electric typewriter adapted for use with the material handling mechanism of the invention as used for cutting the strip of printed information into cut tickets and stacking the cut tickets into a suitable receptacle;

Figure 6:
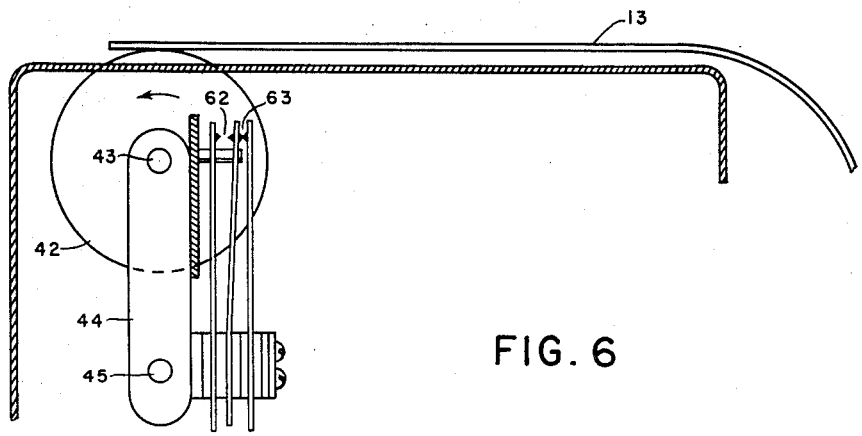
Figure 7:
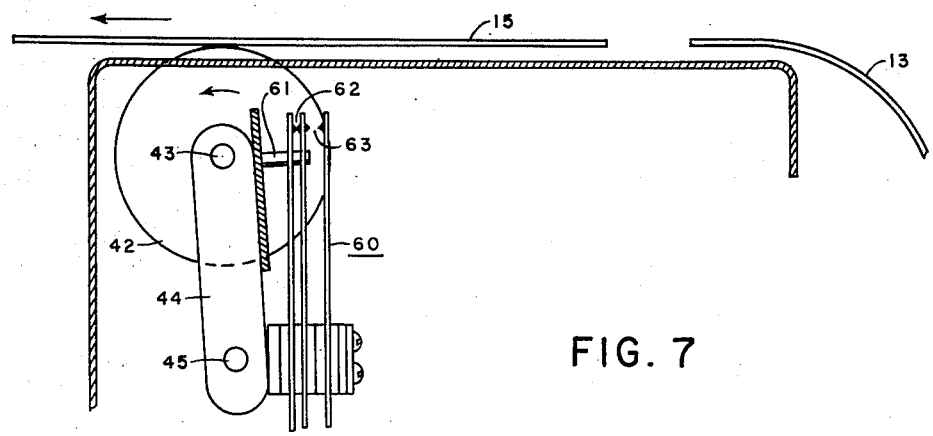

Figs. 6 and 7 are fragmentary detailed sectional views to show the ticket sensing functions of the ticket feed friction roller mechanism; and Figs. 8–11 are fragmentary detailed elevations of the ticket cutting blade and the associated electric switch mechanism for interlocking the operation of the ticket stacking mechanism to be in timed relation with the operation of the ticket cutting mechanism.

Figure 1:
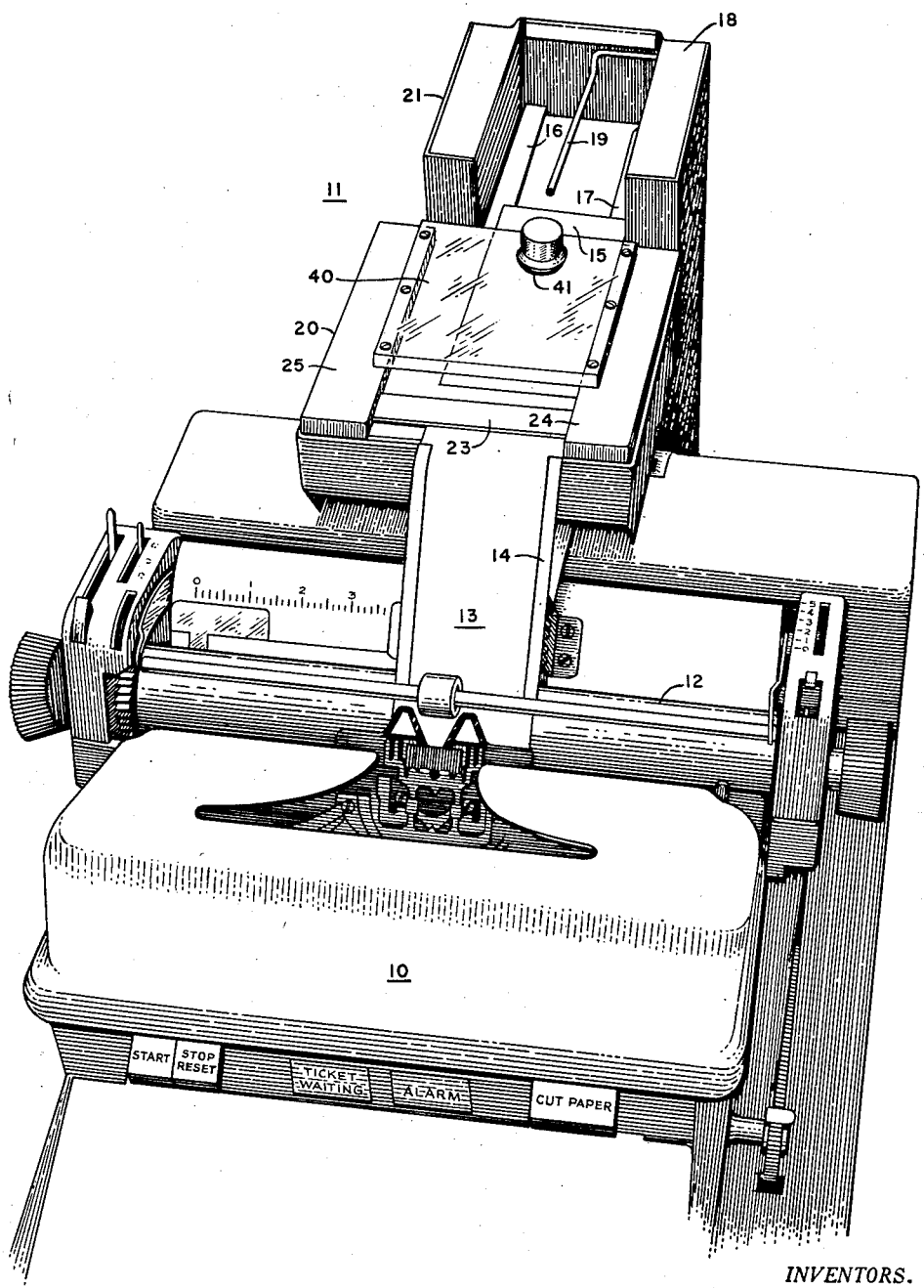
Figure 2:
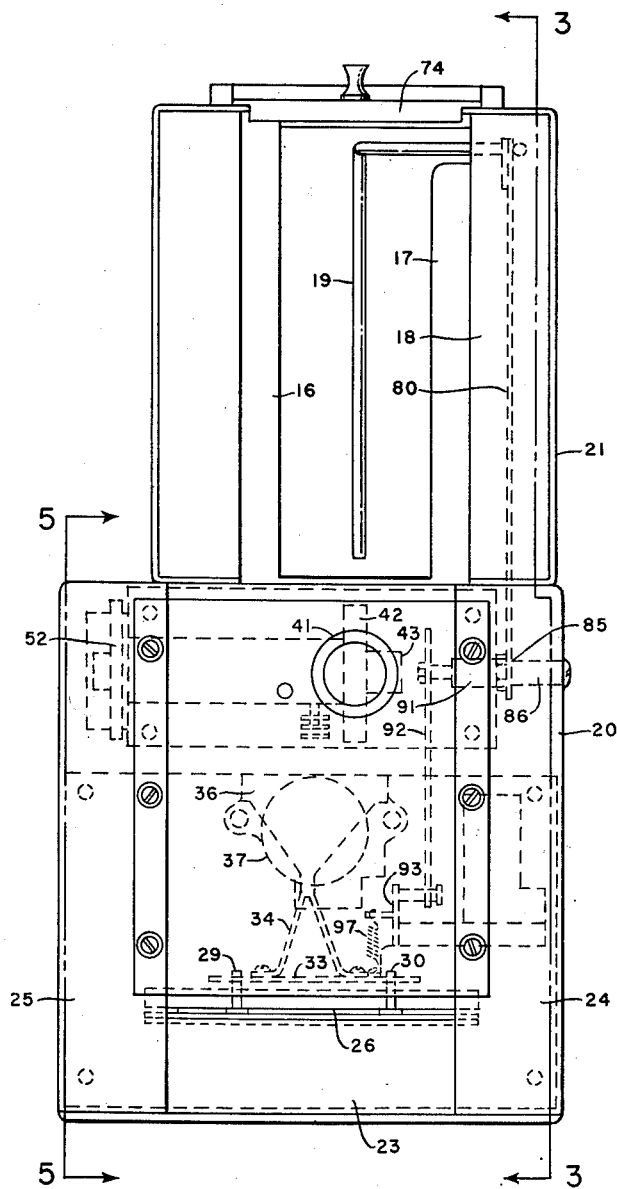
Fig. 2 is a top plan view of the ticket cutting and stacking apparatus.

Referring to Figure 1 of the drawings, a portion of an electric typewriter is generally shown in perspective elevation at 10. The ticket cutting, feeding, and stacking mechanism is generally shown in perspective elevation at 11, to be mounted at the rear of the electric typewriter 10 in a position to receive a strip 13 of flexible material as it is fed through the electric typewriter. The roll of endless flexible strip material, such as paper, is positioned behind and beneath the typewriter 10 (not shown), and the paper strip is fed up through the typewriter roller 12 in a manner automatically controlled by the operation of the electric typewriter, as should be readily understood. For purposes of the present specification, the invention will be described in connection with its use on an electric typewriter of the automatic remotely controlled type such as available under the trade name of "Flexowriter" and which is adapted to impress the desired characters in a desired pattern of lines entirely under the control of electric signals as received from a remotely positioned typewriter control or read-out control circuit. In such an arrangement, the typewriter feed roller 12 is electrically operated under control of signals from the remote read-out control circuit and functions to advance the paper strip 13 through the guideway 14 into the ticket cutter and stacker mechanism of the invention as generally shown at 11.

The ticket cutter and stacker mechanism 11, as applied to the electrically controlled typewriter 10, has been specifically developed for use in a so-called automatic toll ticketing system for dial telephone networks wherein it is expected that toll calls will be dialed by the telephone subscriber. For example, a typical automatic toll ticketing system with which this invention may be used is shown and described in the copending patent application, Serial No. 536,573, filed September 26, 1955, in the names of Morris and Clement, and assigned to the same assignee as the present invention. Briefly stated, it is desired to print a number of lines of information pertaining to a completed telephone toll call on the paper strip 13 following which the strip may be cut to produce a so-called toll ticket containing such lines of printed information. Therefore, a plurality of toll tickets will be printed for a like number of telephone toll calls, and the cutting and stacking apparatus 11 of the invention will cut the paper strip 13 into the required tickets and stack such tickets in a suitable container.

Still referring to Figure 1 of the drawings, a ticket portion 15 is shown to have been just cut from the endless strip 13 and in the process of being fed onto the oppositely disposed guide rails 16 and 17 of the ticket receiving and stacking hopper 18. Means such as a pusher or stacking bar 19 is arranged to be moved downwardly to engage the cut ticket 15 after it has been positioned on the oppositely disposed guide rails 16 and 17, and to flex such cut ticket (of flexible material) so as to force the cut ticket 15 between and beyond the guide rails 16 and 17 to be trapped in the lower receptacle of the hopper 18. According to the invention, it is desirable to time the operation of the stacking bar 19 to coincide with the arrival of the cut ticket 15 on the oppositely disposed guide rails 16 and 17, and a detailed description of the arrangement for producing such timed operation will be later described.

Figure 3:
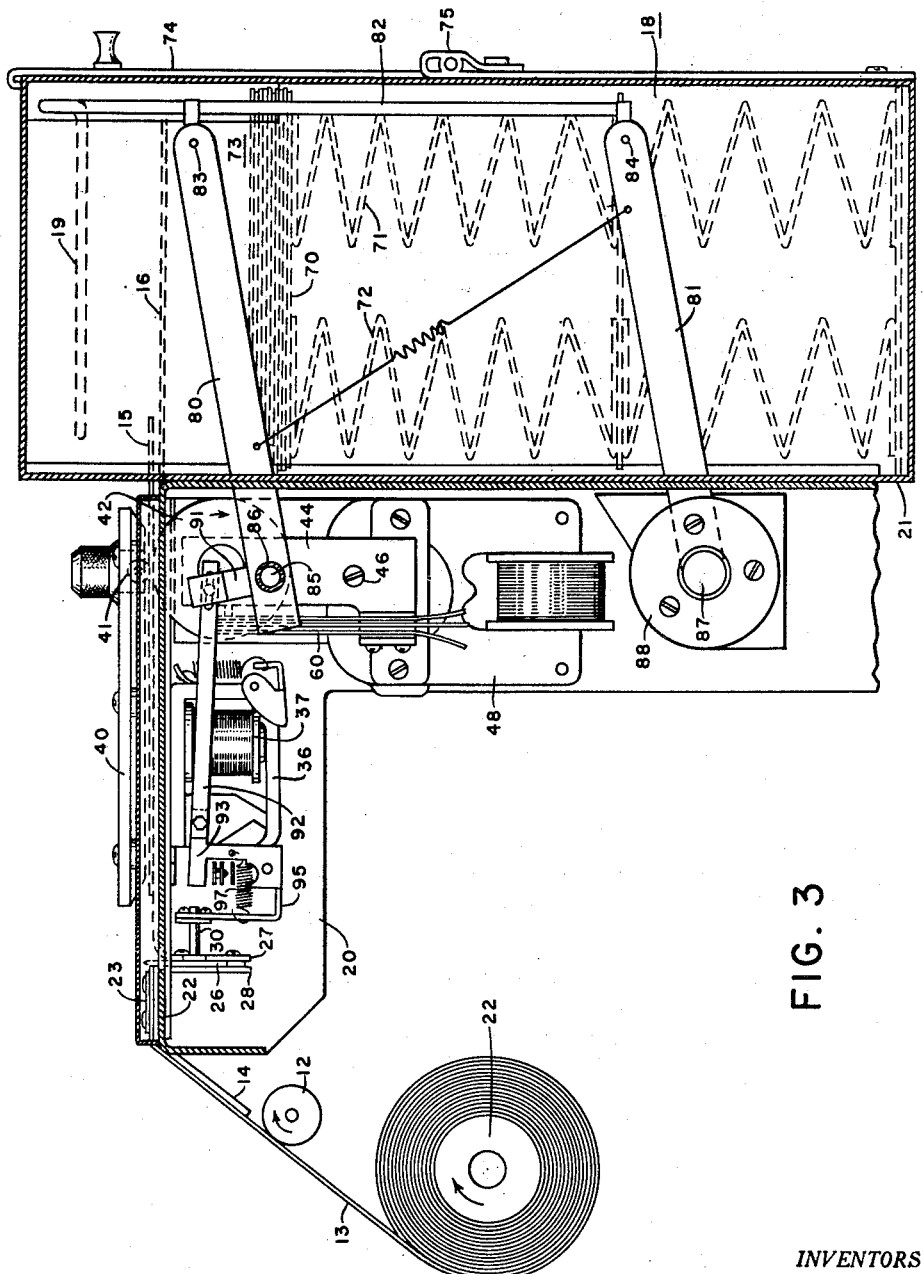
Fig. 3 is a side section taken in the direction of the arrows on the line 3—3 of Fig. 2.
Figure 4:
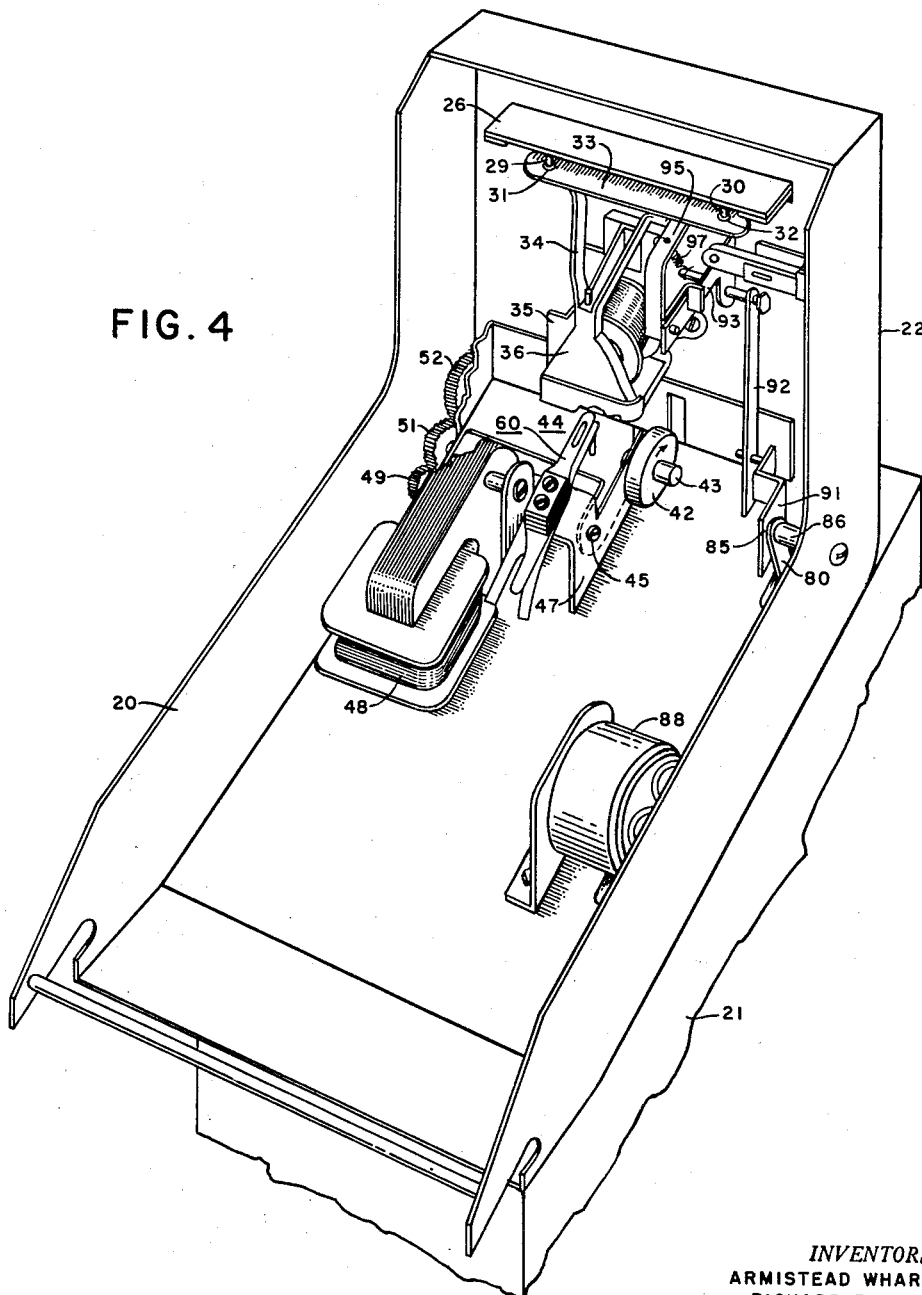
Fig. 4 is a perspective view to show the underside of the cutting and feeding portion of the mechanism.
Figure 5:
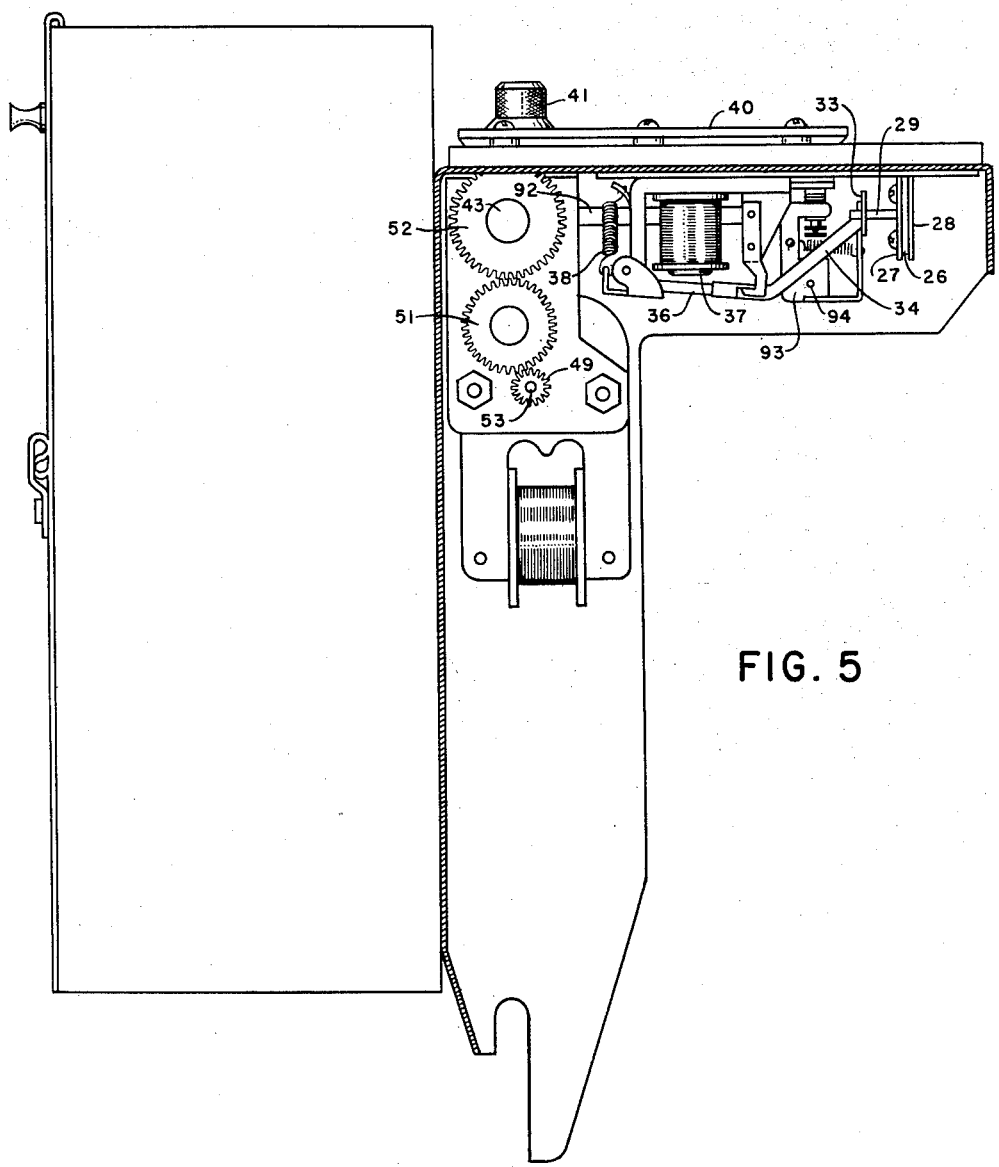
Fig. 5 is a side section taken on the line 5—5 in the direction of the arrows as shown in Fig. 2 of the drawings.
Figure 9:
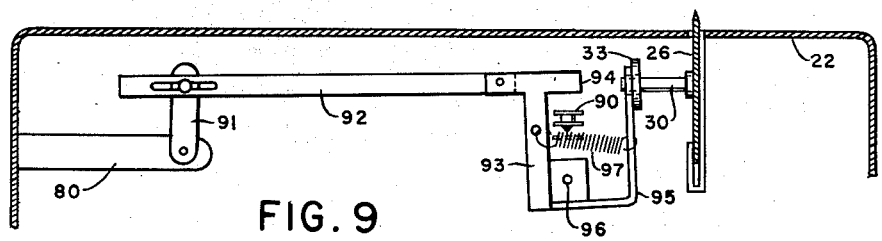

Referring to Figs. 2–5 of the drawings for a more detailed understanding of the material handling mechanism of the invention, the ticket cutting and feeding mechanisms are contained within a suitable framework 20 which may be suitably shaped from sheet metal, for example, to conform to the shape of the electric typewriter 10, while the ticket stacking mechanism and the cut ticket receiving bin are contained within the sheet metal framework, generally shown at 21. Referring first to the ticket cutting and cut ticket feeding mechanism as contained within the sheet metal framework 20, it is desired to point out that the paper strip 13 from the paper storage roll 22 is intermittently fed by the typewriter feed platen roll 12 as shown most specifically in Figs. 1 and 3 of the drawings. The paper strip 13 passes through the strip guideway 14 (see Figs. 1 and 3) onto the upper surface 22 of the sheet metal housing 20 and underneath a cross-member guide 23 to pass between the longitudinal guide member side rails 24 and 25. A guillotine cutter blade 26 is slideably journaled between the guide rails 27 and 28 to be movable upward towards the paper strip 13 in a path transverse to the movement of the paper strip after it has passed beneath the guide bar 23. The cutting blade 26 is provided with a pair of operating pins 29 and 30 extending at right angles therefrom and loosely connected at 31 and 32, respectively, to the crosspiece 33 of the armature yoke 34 of an electromagnet, generally indicated at 35, having the armature 36. The coil spring 38 normally maintains the electromagnet armature 36 in the position shown in Figures 4 and 5 of the drawings with the cutter blade 26 withdrawn from the path of movement of the paper strip 13. Figs. 3 and 9 of the drawings show the cutter blade 26 and the electromagnet armature 36 in the operated position with the cutter 26 cut through the paper strip 13 and a cut ticket 15 in the process of being fed into the ticket stacking bin 18. The loosely journaled pivotal connection of the cutter operating pins 29 and 30 with the yoke crosspiece 33 enables the straight line movement of the cutter blade 26 to provide a desired shearing, or guillotine action, and produces a clean cut cross the paper strip. The operation of the armature 36 of the cutter magnet is obtained whenever the cutter magnet coil 37 is energized and a suitable electrical signal for energizing such magnet coil is obtained from the electric typewriter 10 or its control circuit (not shown) whenever the requisite number of lines, or the required length of paper strip constituting a desired ticket to be cut, have been fed past the transverse position of the cutter blade 26. The exact circuit arrangements for energizing the magnet coil 37 do not form a part of the present invention and are not being described in detail herein although reference may be made to the copending patent application, Serial No. 536,573, filed September 26, 1955, in the name of Morris and Clement, and assigned to the same assignee as the present application, for a description of a typical circuit suitable for use in this connection.

The paper strip as fed by the electric typewriter platen roll 12 to pass beneath the crossbar guide 23 and between the longitudinal guide rails 24 and 25, passes over the transverse position of the cutter blade 26 when the blade is in the normal resting position and beneath the transparent top guide member 40 to a position beneath a pressure roller 41 in contact with a continuously driven friction type of ejector roller 42. The continuously driven friction roller 42 is rotated in a clockwise direction as viewed in Figures 3 and 4 of the drawings, and tends to feed the paper strip towards the receiving hopper 18. However, until the portion of the paper strip engaged with the feed roller 42 is severed by the operation of the cutter blade 26 from the remainder of the paper strip 13, the advancing of such cut portion of the paper strip into the receiving bin 18 is prevented due to the fact that the typewriter platen roll 12 is being rotated only intermittently and grips the paper strip 13 with greater frictional force than the frictional engagement of the friction drive roll 42 with the portion of the paper strip contacting its surface. The pressure roll 41 may be adjusted to vary the frictional contact of that portion of the paper strip that is gripped between the pressure roller 41 and the friction drive roller 42 so as to adjust such frictional grip to be less than the frictional grip between the paper strip 13 and the electric typewriter platen roll 12. As soon as the cutter blade 26 has been moved into cutting position to sever a ticket portion, such as shown at 15 in Figure 3 of the drawings, the frictional drive roll 42 advances such cut ticket portion into the receiving bin 18, as will be later described in more detail.

The frictional drive roller 42 is fixed to a shaft 43, rotatably journaled on a U-shaped frame member 44, pivotally mounted at 45 and 46 to a suitable bracket 47 fastened to the sheet metal frame 20. An electric motor, generally shown at 48, is also secured to the sheet metal framework 20 and is connected by spur gears 49, 51 and 52 to provide for the rotation of the shaft 43 and the friction drive roller 42. The gears 51 and 52 are journaled on the pivotal frame 44 and the pivot points 45 and 46 for the frame 44 are in alignment with the center line of the electric motor drive shaft 53 and spur gear 49 so that the pivotal frame 44 may move about the axes of the pivot points 45 and 46 without disengaging the driving gear connection with the electric motor. The spring tension of a set of contact springs, generally shown at 60 as functioning through the contact spring pusher bar 61, normally tends to pivot the pivotal frame 44 about the pivot points 45 and 46 in the direction of the ticket stacking and receiving bin 18. However, when a portion of the paper strip 13 is engaged between the pressure roller 41 and the continuously rotating friction sheet roller 42 before being severed by the operation of the cutter blade 26, the frictional drag, as the friction roller slips in its engagement with the underside portion of the paper strip 13, causes the frame 44 to pivot around the pivot points 45 and 46 in the direction toward the cutter blade 26. Detailed sectional views showing the pivotal operation of the friction roller 42 and its supporting framework 44 are shown in Figures 6 and 7 of the drawings. The movement of the friction drive supporting framework 44 as shown in Fig. 7 of the drawings when the ticket 15 has been cut from the paper strip 13, will allow spring contacts 62 to be closed to thereby indicate the passage of a cut ticket. On the other hand, the movement of the friction roller 42 and its supporting frame 44 to the position shown in Fig. 6 of the drawings as produced by the frictional drag with the uncut portion of the paper strip 13 will close contacts 63 and open contacts 62 to thereby indicate the presence of a paper strip to be cut and the uncut condition of such paper strip. Again the exact circuit arrangements for utilizing the ejector sensing contacts 62 and 63 as controlled by the pivotal movement of the friction feed roller 42 do not form a part of the present invention and reference may be made to the aforementioned patent application for a description of one such circuit in which the aforesaid ejector contacts are used.

The cut ticket 15 is advanced by the operation of the continuously rotating feed roller 42 onto the guide rails 16 and 17 of the cut ticket stacking hopper 18. In the bin space beneath the oppositely disposed guide rails 16 and 17 there is positioned a depressable platform 70 supported upon suitable coil springs 71 and 72 upon which may be stacked a plurality of cut tickets, such as are generally shown at 73 in Fig. 3 of the drawings. The weight of the accumulated stacked tickets 73 on the platform 70 functions to gradually depress the coil springs 71 and 72, as should be readily understood so as to keep the top level of the stacked tickets at approximately the same position regardless of the amount of the stacked tickets. When it is desired to remove a collection of stacked tickets, the door 74 hinged at 75 may be opened to gain access to the interior of the bin containing such stacked tickets. Each ticket 15 as it is cut and received on the oppositely disposed guide rails 16 and 17, is forcibly moved onto the top of the stack of cut tickets 73 in the lower bin portion by means of a stacking bar 19. The stacking bar is arranged to engage the cut ticket 15 as resting on the oppositely disposed guide rails 16 and 17 generally along its longitudinal center line when the bar 19 is moved downwardly to the top of each cut ticket. A continued downward movement of the stacker bar 19 flexes the cut ticket and forces it between and beyond the oppositely disposed guide rails 16 and 17 and onto the upper surface of the stack of cut tickets 73. Thereafter, when the stacker bar 19 returns to its upper position, as shown in Figures 1 and 3 of the drawings, the cut ticket 15 that has been forced between and beyond the oppositely disposed guide rails 16 and 17 will be trapped beneath such guide rails, thus assuring an orderly stacking of the cut tickets within the stacking bin 18.

The stacking bar 19 is moved by a parallel link motion including the parallel arms 80 and 81 interconnected by the downward extending length 82 of the stacker bar 19 as pivotally connected at 83 and 84. The upper parallel arm 80 is pivotally connected at 85 to a pivot post 86 secured to the side flange of the sheet metal frame 20. The lower parallel arm 81 is secured to the operating shaft 87 of a rotary solenoid magnet 88, which, when energized, tends to rotate the shaft 87 in the clockwise direction and move the parallel arms 80 and 81 downward carrying the stacker bar 19 downward therewith.

Figure 8:
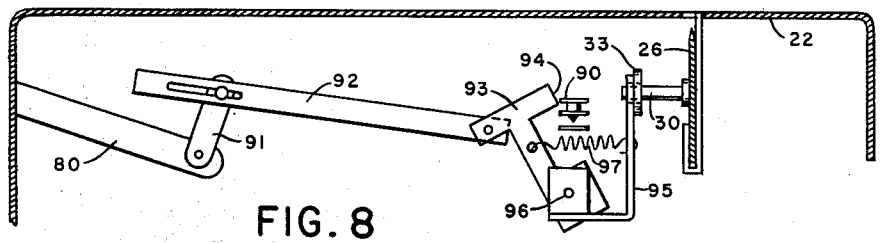
Figure 10:
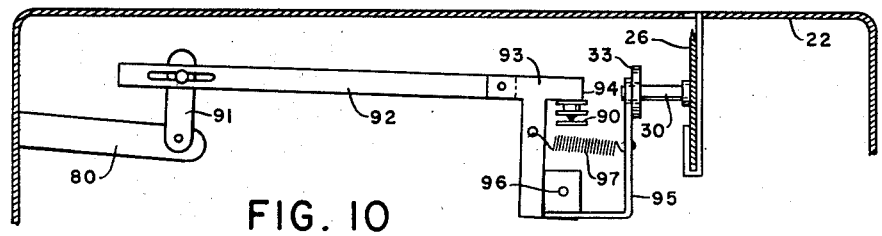
Figure 11:
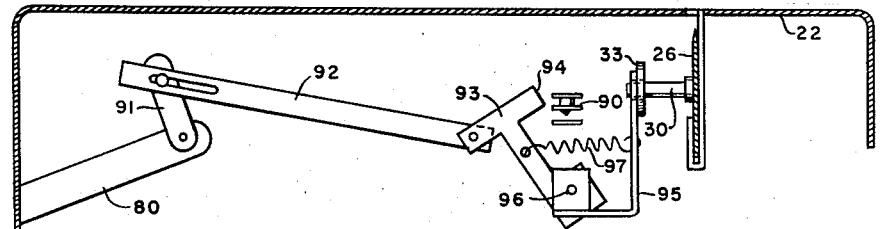

With reference more particularly to Figures 3, 4 and 8–11 of the drawings, the energizing circuit for the stacking solenoid motor 88 is closed when the contact springs 90 are closed. Contact springs 90 are arranged to be closed only when the cutter blade 26 has been moved upwardly to sever a ticket portion 15 and again downwardly to the resting position as shown in Figure 10 of the drawings. When the contact springs 90 are closed to energize the stacking solenoid motor 88, the stacking parallel arms 80 and 81 are moved downwardly to at the same time move the connecting arms 91 and 92 to the left of the drawings as seen by Figs. 8–11 and pivot the latch 93 about the pivot point 96 to open the contact springs 90 as more specifically shown by Figure 11 of the drawings. With the contact springs 90 thereby opened, the stacking solenoid 88 is again deenergized, and the stacking bar 19 again returns to its upper position as shown in Figures 1 and 3 of the drawings. As the stacking bar 19 and parallel arms 80 and 81 return to the upper position, the connecting links 91 and 92 are again moved to the position shown by Figure 8 of the drawings but the pivotal movement of the latch 93 is prevented due to engagement of the latch edge 94 with the contact springs 90. So long as the interlocking latching links 91, 92 and 93 remain as shown in the position of Figure 8 of the drawings, it is not possible to close the contact springs 90 for again energizing the stacking solenoid motor 88. As soon as the cutter magnet coil 37 is energized, however, to move the yoke cross-member 33 and the cutter blade 26 upward to the cutting position as shown in Figures 3 and 9 of the drawings, the link member 95 upon which the latch member 93 is pivoted at 96 will be moved upward to disengage the edge 94 of the latch member with the contact springs 90 so as to enable the latch member 93 to pivot about the pivot point 96 in response to the tension of the coil spring 97. Thereafter, when the cutter magnet is deenergized to again allow the cutter blade 26 to return from the cutting position to the lower resting position, the latch member 93 will engage the contact springs 90 to close such springs as shown in Figure 10 of the drawings, thereby again completing a circuit for energizing the stacking solenoid motor 88 and the entire sequence of operations is repeated. It should be apparent that the latch and link mechanism including the latch element 93 and the link elements 91, 92 and 95, together with the set of contact springs 90, provides for the control of the operation of the stacking bar 19 to be in timed relation to the feeding of a cut ticket onto the oppositely disposed guide rails 16 and 17 and that such operation of the stacking solenoid motor 88 can be obtained once only for each movement of the cutter blade to the resting position from a cutting position so that in effect the entire operation of ticket cutting and sacking is produced by the single electric signal for operating the cutter magnet 35.

Although the invention has been specifically described in connection with its use for the feeding, cutting, and stacking of paper tickets as produced from a strip of paper fed through an electric typewriting machine, it should be understood that such material handling mechanism may be used with other types of recording and reproducing machinery wherein flexible strip material is employed as the recording medium. For example, the material handling mechanism of the invention may be used to cut and stack records on flexible material as fed through either a paper punch or an electrically controlled adding machine, or the like.

Various modifications may be made within the spirit of the invention and the scope of the appended claims.

What is claimed is:

1. Material handling mechanism comprising a continuous length of material, means for imparting movement to said length of material, cutting means having a normal position in proximity to said material and effective when operated for severing a portion of said material after said material is advanced and then returning to its normal position, means for receiving said severed portion and including a pair of oppositely disposed elements in a position to receive and support a severed portion, means for advancing a severed portion into supporting relation with said elements, and means coupled to said cutting means for forcing said said portion between and beyond said elements only in response to said cutting means returning to its normal position after a completed operation thereof.

2. Material handling mechanism comprising, means for advancing a continuous length of material, cutting means having a normal position in proximity to said material and effective when operated for severing a portion of said material after said material is advanced and then returning to its normal position, means for receiving said severed portion and including a pair of oppositely disposed elements in a position to receive and support a severed portion, means operative in response to the severing of a portion for advancing the severed portion into supporting relation with said elements, and means coupled to said cutting means operative in timed relation to the severing of a portion for forcing the severed portion after it has been advanced into supporting relation with said elements to a position between and beyond said elements only in response to said cutting means returning to its normal position after a completed operation thereof.

3. Material handling mechanism comprising, a guideway, means to advance a continuous length of flexible material through said guideway, cutting means having a normal position in proximity to said guideway effective when operated for severing a portion of said material after said material is advanced and then returning to its normal position, a stacking bin having oppositely disposed end and side walls, said bin being positioned with its side walls in alignment with said guideway and an opening in one of said end walls adjacent the end of said guideway, a pair of oppositely disposed elements fastened to said side walls in a position to receive and support a severed portion, means for advancing a severed portion from said guideway through said opening onto said elements, and stacking means coupled to said cutting means and positioned above said elements and movable downward between said elements for engaging the severed portion to flex and force said portion downward between said elements and thereby trap said portion beneath said elements only in response to said cutting means returning to its normal position after a completed operation thereof.

4. Material handling mechanism comprising, a guideway, means to advance a continuous length of flexible material through said guideway, cutting means having a normal position in proximity to said guideway effective when operated for severing a portion of said material after said material is advanced and then returning to its normal position, a stacking bin having oppositely disposed end and side walls, said bin being positioned with its side walls in alignment with said guideway and an opening in one of said end walls adjacent the end of said guideway, a pair of oppositely disposed elements fastened to said side walls in a position to receive and support a severed portion, means operative in response to the severing of a portion for advancing a severed portion from said guideway through said opening onto said elements, and stacking means coupled to said cutting means and positioned above said elements and movable downward between said elements in timed relation to the severing of a portion for engaging the severed portion after it has been advanced to be supported on said elements only in response to said cutting means returning to its normal position after a completed operation thereof, said stacking means engaging a severed portion at a point intermediate said elements to flex and force said portion downward between said elements and thereby trap said portion beneath said elements.

5. Material handling mechanism comprising, first means for advancing a continuous length of material, cutting means for severing a portion of said material after said material is advanced by said first means, means for receiving said severed portion, a continuously rotating drive wheel engaging said material as it is advanced beyond said cutting means and operable to advance a severed portion into said receiving means, said drive wheel tending to advance said material at a greater rate of speed than the speed of advancing of said material by said first means, and means for sensing a severed portion including means rotatably supporting said drive wheel on a pivotally mounted journal to be moved in one direction due to the reaction of the frictional engagement of the drive wheel with said material while said material is uncut and being moved in an opposite direction when the portion of said material is cut and free to be advanced by said drive wheel and indicating means responsive to movement of said journal in the opposite direction to thereby indicate the severing of a portion of the material.

6. Material handling mechanism comprising, first means for advancing a continuous length of material, cutting means having a normal position in proximity to said material and effective when operated for severing a portion of said material after said material is advanced by said first means and then returning to its normal position, means for receiving said severed portion and including a pair of oppositely disposed elements in a position to receive and support a severed portion, a continuously rotating drive wheel engaging said material as it is advanced beyond said cutting means and operable to advance a severed portion into supporting relation with said elements, said drive wheel tending to advance said material at a greater rate of speed than the speed of advancing of said material by said first means, means for sensing a severed portion including means rotatably supporting said drive wheel on a pivotally mounted journal to be moved in one direction due to the reaction of the frictional engagment of the drive wheel with said material while said material is uncut and being moved in an opposite direction when the portion of said material is cut and free to be advanced by said drive wheel and indicating means responsive to movement of said journal in the opposite direction to thereby indicate the severing of a portion of the material, and means coupled to said cutting means for forcing said portion between and beyond said elements only in response to said cutting means being returned to its normal position after a completed operation thereof.

7. Material handling mechanism comprising, a guideway, first means to advance a continuous length of flexible material through said guideway, cutting means having a normal position in proximity to said guideway and effective when operated for severing a portion of said material after said material is advanced and then returning to its normal position, a stacking bin having oppositely disposed end and side walls, said bin being positioned with its side walls in alignment with said guideway and an opening in one of said walls adjacent the end of said guideway, a pair of oppositely disposed elements fastened to said side walls in a position to receive and support a severed portion, a continuously rotating drive wheel engaging said material as it is advanced beyond said cutting means and operable to advance a severed portion from said guideway into supporting relation with said elements, said drive wheel tending to advance said material at a greater rate of speed of advancing of said material by said first means, means for sensing a severed portion including means rotatably supporting said drive wheel on a pivotally mounted journal to be moved in one direction due to the reaction of the frictional engagement of the drive wheel with said material while said material is uncut and being moved in an opposite direction when the portion of said material is cut and free to be advanced by said drive wheel and indicating means responsive to movement of said journal in the opposite direction to thereby indicate the severing of a portion of the material, and means coupled to said cutting means and operative in timed relation to the severing of a portion for forcing the severed portion after it has been advanced into supporting relation with said elements to a position between and beyond said elements only in response to said cutting means returning to its normal position after a completed operation thereof.

8. Material handling mechanism comprising, a guideway, first means to advance a continuous length of flexible material through said guideway, cutting means in proximity to said guideway and effective when operated for severing a portion of said material after said material is advanced and then returning to its normal position, a stacking bin having oppositely disposed end and side walls, said bin being positioned with its side walls in alignment with said guideway and an opening in one of said end walls adjacent the end of said guideway, a pair of oppositely disposed elements fastened to said side walls in a position to receive and support a severed portion, a continuously rotating drive wheel engaging said material as it is advanced beyond said cutting means and operable to advance a severed portion from said guideway into supporting relation with said elements, said drive wheel tending to advance said material at a greater rate of speed than the speed of advancing of said material by said first means, means for sensing a severed portion including means rotatably supporting said drive wheel on a pivotally mounted journal to be moved in one direction due to the reaction of the frictional engagement of the drive wheel with said material while said material is uncut and being moved in an opposite direction when the portion of said material is cut and free to be advanced by said drive wheel and indicating means responsive to movement of said journal in the opposite direction to thereby indicate the severing of a portion of the material, and stacking means coupled to said cutting means and positioned above said elements and movable downward between said elements in timed relation to the severing of a portion for engaging the severed portion after it has been advanced to be supported on said elements only in response to said cutting means returning to its normal position after a completed operation thereof, said stacking means engaging a severed portion at a point intermediate said elements to flex and force said portion downward between said elements and thereby trap said portion beneath said elements.

9. Material handling mechanism comprising, first means for advancing a continuous length of material, cutting means having a normal position in proximity to said material and effective when operated for severing a portion of said material after said material is advanced by said first means and then returning to its normal position, means for receiving said severed portion and including a pair of oppositely disposed elements in a position to receive and support a severed portion, a continuously rotating drive wheel engaging said material as it is advanced beyond said cutting means and operable to advance a severed portion into supporting relation with said elements, said drive wheel tending to advance said material at a greater rate of speed than the speed of advancing of said material by said first means, and means coupled to said cutting means and operated in timed relation to the operation of said cutting means for forcing said portion between and beyond said elements only in response to said cutting means returning to its normal position after a completed operation thereof.

10. Material handling mechanism comprising, a guideway, first means to advance a continuous length of flexible material through said guideway, cutting means having a normal position in proximity to said guideway and effective when operated for severing a portion of said material as said material is advanced and then returning to its normal position, a stacking bin having oppositely disposed end and side walls, said bin being positioned with its side walls in alignment with said guideway and an opening in one of said end walls adjacent the end of said guideway, a pair of oppositely disposed elements fastened to said side walls in a position to receive and support a severed portion, a continuously rotating drive wheel engaging said material as it is advanced beyond said cutting means and operable to advance a severed portion from said guideway into supporting relation with said elements, said drive wheel tending to advance said material at a greater rate of speed than the speed of advancing of said material by said first means, and stacking means coupled to said cutting means and positioned above said elements and movable downward between said elements in timed relation to the severing of a portion for engaging the severed portion after it has been advanced to be supported on said elements only in response to said cutting means returning to its normal position after a completed operation thereof, said stacking means engaging a severed portion at a point intermediate said elements to flex and force said portion downward between said elements and thereby trap said portion beneath said elements.

11. Material handling mechanism comprising, first means for advancing a continuous length of material, a cutter movable from a resting position towards said material to a cutting position for engaging and severing a portion of said material after said material is advanced by said first means, means to momentarily move said cutter to and from said material and thereby sever a portion of said material, means for receiving said severed portion and including a pair of oppositely disposed elements in a position to receive and support a severed portion, a continuously rotating drive wheel engaging said material as it is advanced beyond said cutting means and operable to advance a severed portion into supporting relation with said elements, said drive wheel tending to advance said material at a greater rate of speed than the speed of advancing of said material by said first means, and means coupled to said cutter and operated only in response to the return of said cutter to the resting position from the cutting position for forcing said portion between and beyond said elements.

12. Material handling mechanism comprising, a guideway, first means to advance a continuous length of flexible material through said guideway, a cutter movable from a resting position towards said material in said guideway to a cutting position for engaging and severing a portion of said material after said material is advanced, means to momentarily move said cutter to and from said material and thereby sever a portion of said material, a stacking bin having oppositely disposed end and side walls, said bin being positioned with its side walls in alignment with said guideway and an opening in one of said end walls adjacent the end of said guideway, a pair of oppositely disposed elements fastened to said side walls in a position to receive and support a severed portion, a continuously rotating drive wheel engaging said material as it is advanced beyond said cutting means and operable to advance a severed portion from said guideway into supporting relation with said elements, and stacking means coupled to said cutter and positioned above said elements and movable downward between said elements only in response to the return of said cutter to the resting position from the cutting position for engaging the severed portion after it has been advanced to be supported on said elements, said stacking means engaging a severed portion at a point intermediate said elements to flex and force said portion downward between said elements and thereby trap said portion beneath said elements.

13. Material handling mechanism comprising, a guideway, first means to advance a continuous length of flexible material through said guideway, a cutter movable from a resting position towards said material in said guideway to a cutting position for engaging and severing a portion of said material after said material is advanced, means to momentarily move said cutter to and from said material and thereby sever a portion of said material, a stacking bin having oppositely disposed end and side walls, said bin being positioned with its side walls in alignment with said guideway and an opening in one of said end walls adjacent the end of said guideway, a pair of oppositely disposed elements fastened to said side walls in a position to receive and support a severed portion, a continuously rotating drive wheel engaging said material as it is advanced beyond said cutting means and operable to advance a severed portion from said guideway into supporting relation with said elements, said drive wheel tending to advance said material at a greater rate of speed than the speed of advancing of said material by said first means, means for sensing a severed portion including means rotatably supporting said drive wheel on a pivotally mounted journal to be moved in one direction due to the reaction of the frictional engagement of the drive wheel with said material while said material is uncut and being moved in an opposite direction when the portion of said material is cut and free to be advanced by said drive wheel and indicating means responsive to movement of said journal in the opposite direction to thereby indicate the severing of a portion of the material, and stacking means coupled to said cutter and positioned above said elements and movable downward between said elements only in response to the return of said cutter to the resting position from the cutting position for engaging the severed portion after it has been advanced to be supported on said elements, said stacking means engaging a severed portion at a point intermediate said elements to flex and force said portion downward between said elements and thereby trap said portion beneath said elements.

14. Material handling mechanism comprising, first means for advancing a continuous length of material, a cutter movable from a resting position towards said material to a cutting position engaging said material for severing a portion of said material after said material is advanced by said first means, means to momentarily move said cutter to and from said material and thereby sever a portion of said material, means for receiving said severed portion and including a pair of oppositely disposed elements in a position to receive and support a severed portion, means to advance a severed portion into supporting relation with said elements, and means coupled to said cutter and operated only in response to the return of said cutter to the resting position from the cutting position for forcing said portion between and beyond said elements.

15. Material handling mechanism comprising, a guideway, first means to advance a continuous length of flexible material through said guideway, a cutter movable from a resting position towards said material in said guideway to a cutting position for engaging and severing a portion of said material after said material is advanced, means to momentarily move said cutter to and from said material and thereby sever a portion of said material, a stacking bin having oppositely disposed end and side walls, said bin being positioned with its side walls in alignment with said guideway and an opening in one of said end walls adjacent the end of said guideway, a pair of oppositely disposed elements fastened to said side walls in a position to receive and support a severed portion, means to advance a severed portion from said guideway into supporting relation with said elements, and stacking means coupled to said cutter and positioned above said elements and movable downward between said elements only in response to the return of said cutter to the resting position from the cutting position for engaging the severed portion after it has been advanced to be supported on said elements, said stacking means engaging a severed portion at a point intermediate said elements to flex and force said portion downward between said elements and thereby trap said portion beneath said elements.

References Cited in the file of this patent

UNITED STATES PATENTS

| | | |
|---|---|---|
| 1,981,229 | Gillet | Nov. 20, 1934 |
| 2,072,532 | Roedels | Mar. 2, 1937 |
| 2,173,831 | Eitzen | Sept. 26, 1939 |
| 2,632,545 | Schubert | Mar. 24, 1953 |
| 2,644,685 | Rockwell | July 7, 1953 |
| 2,670,954 | Bach | Mar. 2, 1954 |